(12) United States Patent
Denz

(10) Patent No.: US 6,412,470 B1
(45) Date of Patent: Jul. 2, 2002

(54) METHOD AND ARRANGEMENT FOR CONTROLLING THE DRIVE UNIT OF A VEHICLE

(75) Inventor: Helmut Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/573,677

(22) Filed: May 19, 2000

(30) Foreign Application Priority Data

May 19, 1999 (DE) .......................................... 199 22 905
Jun. 30, 1999 (DE) .......................................... 199 30 009

(51) Int. Cl.$^7$ ................................................ F02D 1/00

(52) U.S. Cl. ........................ 123/396; 123/399; 123/352

(58) Field of Search ................................ 123/399, 396, 123/361, 352

(56) References Cited

U.S. PATENT DOCUMENTS 5,875,760 A    3/1999  Bauer et al.

FOREIGN PATENT DOCUMENTS

DE           199 13 272         9/2000

*Primary Examiner*—John Kwon
(74) *Attorney, Agent, or Firm*—Walter Ottesen

(57) ABSTRACT

The invention is directed to a method and an arrangement for controlling the drive unit of a motor vehicle. At least two mutually redundant measurement quantities are detected which are compared to threshold values. A function of the control of the drive unit is activated or deactivated in dependence upon the ratio of at least one of the measurement quantities to at least one of the threshold values. Each measurement quantity is compared to at least one threshold value; signals, which characterize exceeding or dropping below the threshold value, are generated; and the function is activated or deactivated when a pregiven combination of these signals is present.

16 Claims, 7 Drawing Sheets

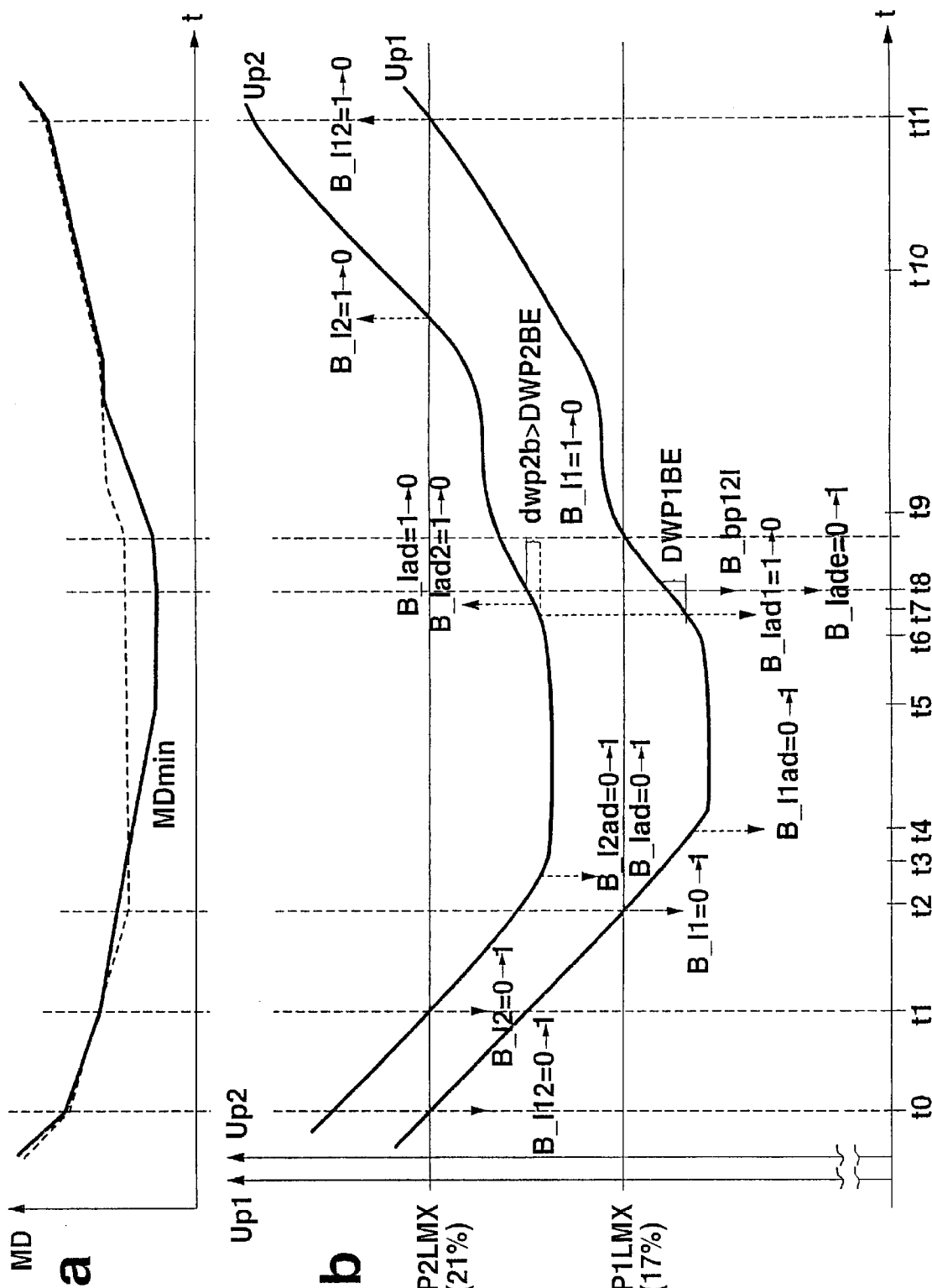

METHOD AND ARRANGEMENT FOR CONTROLLING THE DRIVE UNIT OF A VEHICLE

BACKGROUND OF THE INVENTION

German patent application 199 13 272.0, filed Mar. 24, 1999, discloses a monitoring strategy for a drive unit of a vehicle wherein a maximum rpm is pregiven which is not be exceeded when a released accelerator pedal is recognized (idle command) and the rpm of the drive unit is limited to this maximum rpm as may be required. In this way, it is ensured that a predetermined rpm limit value is not exceeded when there is a driver command for idle. The control of the drive unit is made safe by this measure when a defect is present. What is essential is the reliable recognition of the released accelerator pedal for which, as required, a change of the corresponding measurement quantity must be adapted.

The foregoing does not only apply to this so-called monitoring rpm limiter but also to other functions which are activated with the presence of a measurement quantity in a pregiven value region (for example, by the recognition of the release of the accelerator pedal or by the actuation of the accelerator pedal such as the limiting of the torque, an idle rpm control, etcetera). The above-mentioned functions (including the monitor rpm limiter) are used, depending upon configuration, individually or in any desired combination.

U.S. Pat. No. 5,875,760 discloses deriving limit values from two measurement quantities detected by two redundant measuring devices. Reaching the idle range is indicated when there is a drop below these limit values.

SUMMARY OF THE INVENTION

It is an object of the invention to provide measures with which reaching a pregiven value region of a measurement quantity is reliably detected and especially the idle region of a measurement quantity representing the driver command for controlling a drive unit.

The method of the invention is for controlling the drive unit of a vehicle and includes the steps of: detecting a first measurement quantity; detecting a second measurement quantity and the first and second measurement quantities being redundant to each other; comparing each of the measurement quantities to a threshold value; generating signals characterizing a drop below or an increase above the threshold value; and, activating or deactivating a function for controlling the drive unit when a pregiven combination of the signals is present.

With the procedure described below, a reliable recognition of reaching a pregiven value range of a measurement quantity is provided, especially reaching of the idle range of a measurement quantity representing the driver command for controlling a drive unit. This is achieved because the suitable combination of signals ensures a recognition even under unfavorable operating conditions. The signals indicate reaching the idle region and are formed in various ways. Changes in the region of the measuring device which detects the measurement quantity are also considered.

It is especially advantageous to apply the described measures in combination with an rpm limiter or torque limiter which is activated with the idle command of the driver. With the reliable and precise recognition of the idle command (or of reaching the value range representing the idle range of at least one measurement quantity for the driver command), an omission of the activation of the rpm limiter or an unwanted activation of the rpm limiter, which would negatively affect the function of the drive unit, is effectively avoided.

It is advantageous when the described procedure is utilized in combination with a solution which recognizes leaving the idle range of the measurement quantity representing the driver command when there is a pregiven limit value. Already at an earlier limit value, a slight increase of the torque of the drive unit takes place as preparation for the driving operation to follow. In this case, the described procedure guarantees that no crossovers occur between the limit and the torque control. This is so because limiting takes place only when the idle range is actually recognized and the limiting is canceled at the start of opening the throttle flap to increase torque.

With potentiometers, the measurement quantities can become incorrect because of increased contact resistance between the potentiometer track and the potentiometer wiper contact. It is especially advantageous when using potentiometers for determining the driver command (accelerator pedal position) that the detection of the idle range and therefore the activation of the limiter is ensured also in the cases where there is a rapid release of the accelerator pedal by the driver.

It is especially advantageous that continuous torque crossovers are ensured in the idle command range when activating and deactivating the limiter.

It is especially advantageous that the limiter is always activated when the accelerator pedal is actually released and when, with the activation of the rpm limiter, no torque changes of the drive unit result which are unexpected for the driver; and, that the limiter is deactivated when the driver demands an increase of the torque via the accelerator pedal. In an advantageous manner, the torque is controlled via a filter function starting from the current value of the limiter and the command for an increase by the driver is made safe by ancillary conditions.

The use of the procedure described below is advantageous in combination with other measurement quantities such as with measurement quantities, which represent the braking command of the driver, and with the aid of which measurement quantities, for example, the presence of the brake command zero is determined.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
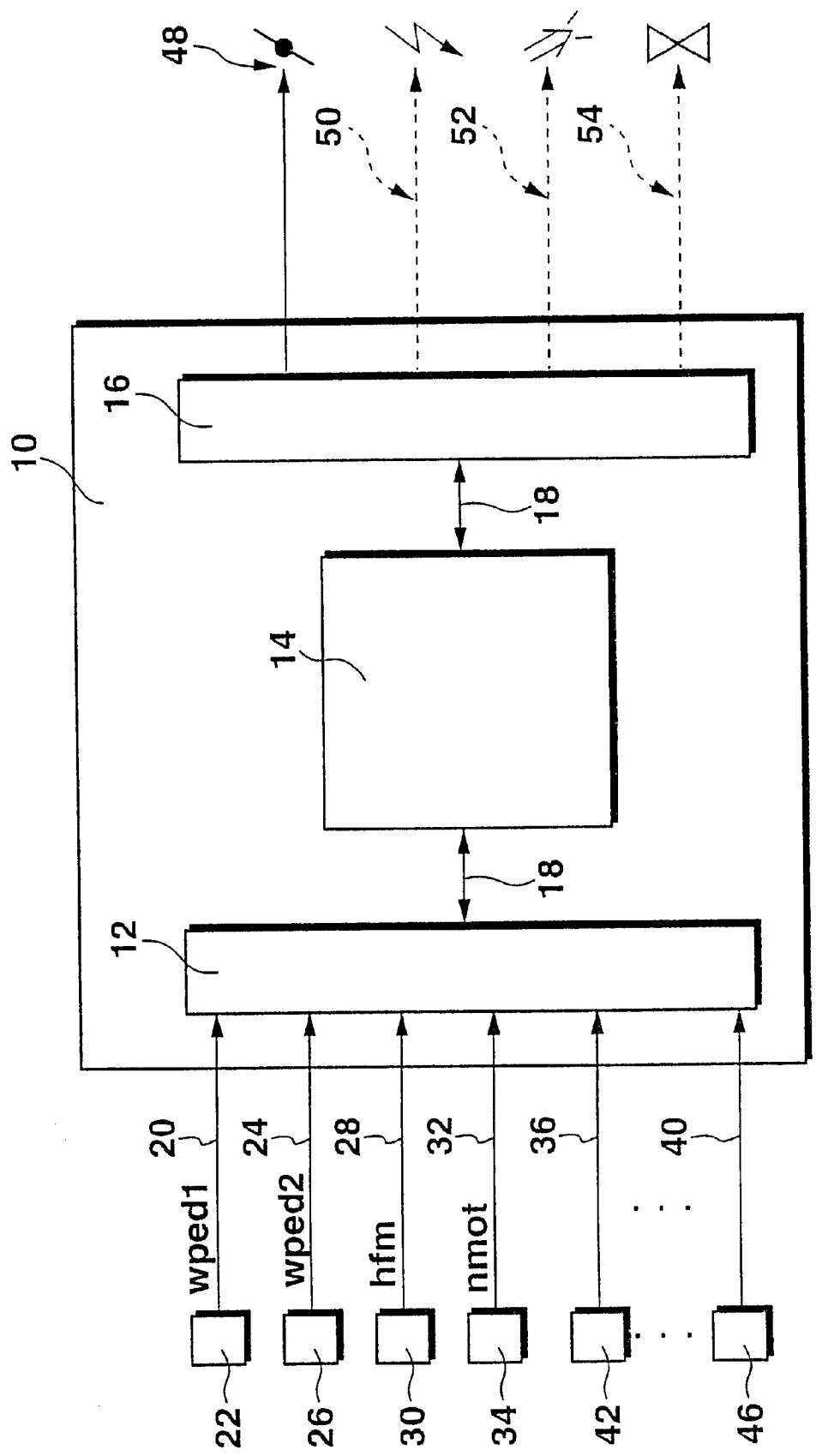
FIG. 1 is an overview block circuit diagram of a control apparatus for controlling a drive unit such as an internal combustion engine.

FIG. 1 shows an electronic control apparatus 10 which has at least one input circuit 12, at least one computer unit (including memory elements such as microcomputers) 14 and at least one output circuit 16. The input circuit, microcomputer and output circuit are interconnected via a communication system 18 for the mutual exchange of data.

The following input lines are connected to the input circuit 12. Input lines 20 and 24 lead from respective first and second measuring units 22 and 26 for detecting first and second measurement quantities (wped1, wped2) for the accelerator pedal position. Input lines 36 to 40 are from measuring devices 42 to 46, respectively, which provide additional operating quantities of the drive unit and/or of the vehicle. These operating quantities are needed for carrying out the functions executed by the control apparatus 10 and include, in the case of the control of an internal combustion engine, the supplied air mass, the engine rpm, the temperature of the inducted air, the ambient pressure, etcetera.

The electronic control apparatus 10 controls actuators via the output circuit 16 in accordance with the detected measurement quantities and especially in accordance with at least one of the measurement quantities determined by the measurement devices 22 and/or 26. In the preferred embodiment of a control of an internal combustion engine, the charge of the engine is controlled by influencing the air supply of the engine via a throttle flap 48. In addition, the ignition time point 50 is adjusted, the metering of fuel 52 is influenced and/or a turbocharger 54 is controlled.

In the preferred embodiment, the redundantly detected measurement quantity is the position wped of an accelerator pedal. This redundant measurement quantity is evaluated in the control which is executed.by the control apparatus 10. In the preferred embodiment, an actuator for the control of the engine is controlled by the control apparatus 10 on the basis of one of the measurement quantities; whereas, the other measurement quantity serves to monitor the correctness of the measurement quantity which forms the basis of the control function. In other embodiments, the actuator is controlled in dependence upon a value (mean value, maximum value or minimum value) which is derived from both quantities. What is essential is that both measurement quantities can change between a minimum value and a maximum value. At least one of the extreme values is changeable in dependence upon external conditions such as temperature, deterioration, etcetera. For this reason, and with a view as to the accuracy and reliability of the detection of the measurement quantities, a precise knowledge of at least one of the extreme values of the measurement quantities is required in the evaluation of the measurement quantities for control. This has special significance in the detection of the position of the accelerator pedal, brake pedal and/or the position of an actuator which can be actuated such as a throttle flap, charge flap, electric motor for the operating brakes, etcetera.

An imprecise adaptation of the evaluated measurement quantity (for example to the changing lower extreme value in the example of the measurement quantity for a released accelerator pedal) leads, as a rule, to an increased lost motion when the measurement quantity is only formed from the signal of the measuring device when this signal exceeds the lower extreme value. This dead region can be increased when a second measuring device is provided for monitoring the measurement quantity. The second measuring device makes the measuring quantity redundantly available but likewise burdened by tolerances when data are derived from the measurement quantities while considering the tolerances contained in the measurement signals. This derivation is made, for example, in the presence of the idle region, and the determination of the released accelerator pedal. This dead region is reduced by adapting the lower extreme values of the measurement quantities.

If potentiometers are utilized as measuring devices, then it must be additionally considered that abraded material of the potentiometer track can form at the reversal point of the potentiometer (for example, the stop point) and thereby form an increased transfer resistance between the track and the wiper contact which can lead to a temporary drop of the voltage value. An adaptation of this value as a lower extreme value would lead to the situation that the adaptation value is too low and that the data (which are derived from the measurement quantity and can, for example, be a released accelerator pedal) can no longer be formed when the contact resistance has again become less.

The procedure described below is utilized in combination with the detection of all measurement quantities in a vehicle which are characterized by at least one changing extreme value which is evaluated to form data for the control of the vehicle. In the preferred embodiment, the procedure is used in combination with potentiometers or contactless angle transducers. In angle transducers, the problematic of the excessive contact resistance does not occur. These transducers detect the position of an operator-controlled element (for example, accelerator pedal, brake pedal) and/or the position of an actuator in the vehicle (for example, the throttle flap, charge flap, brake actuator, etcetera).

Figure 2:
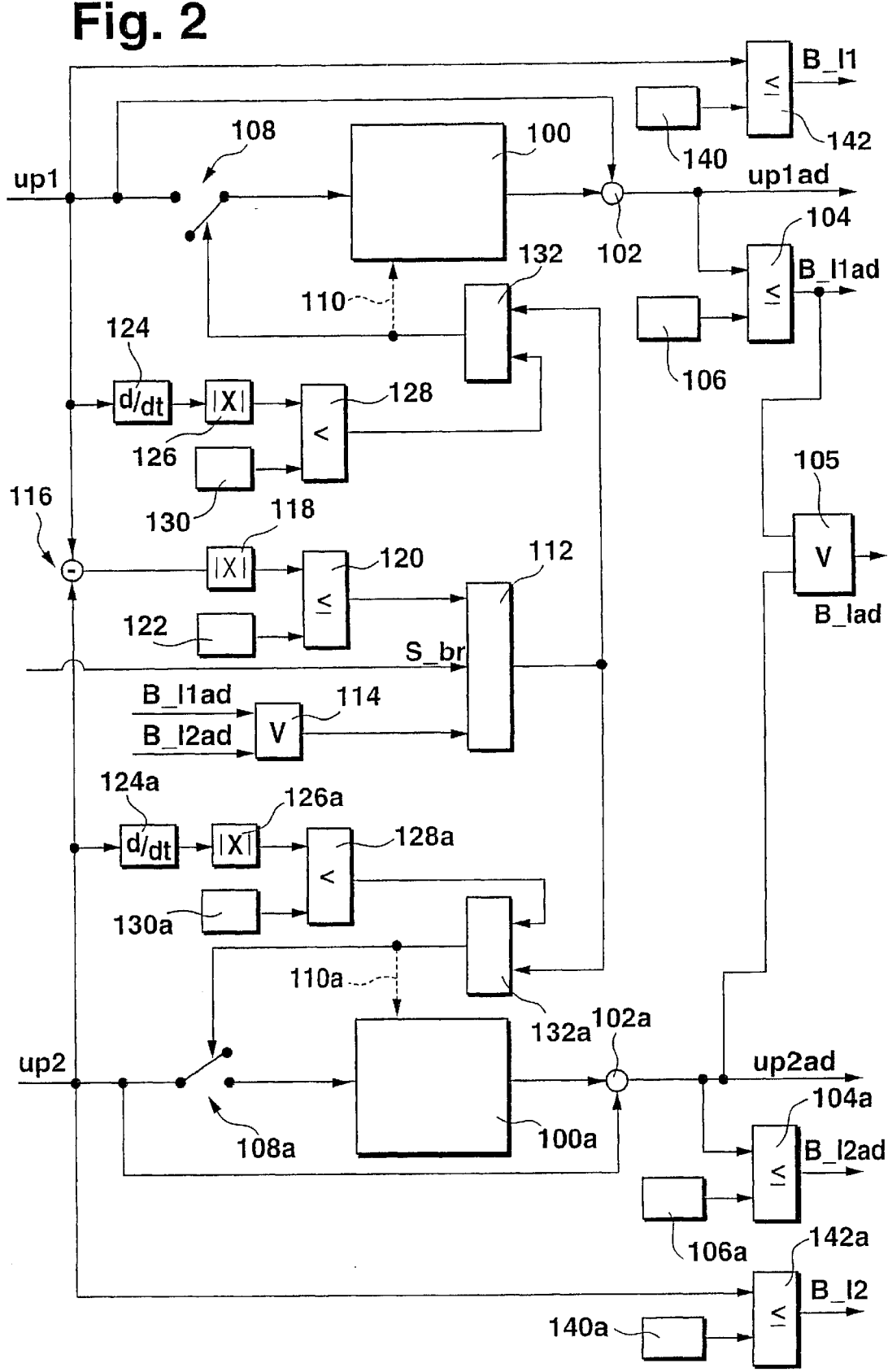
FIGS. 2 and 3 are sequence diagrams based on the example of measurement quantities representing the driver command and show preferred embodiments for the adaptation of the minimum value of the measurement quantities and the determination of signals and, based on the signals, the detection and leaving of the idle command region is displayed.

In FIG. 2, a sequence diagram is shown which describes a preferred procedure for the adaptation of an extreme value. The sequence diagram shows a preferred realization as a program of the microcomputer 14.

The extreme value of the measurement quantity is adapted via an integrator in the lowpass circuit. The adaptation is permitted when the adapted extreme value is reached up to a pregiven offset value or, independently therefrom, whether the brake pedal is actuated. The minimum values, which occur in the lowpass filtering, are taken up in a minimum value memory where they represent the adapted extreme value of the measurement quantity.

The stored minimum value is increased to the current value (which can therefore also be greater) when actuating the brake pedal whereby a rapid adaptation in the direction leading away from the extreme value is made possible. In addition thereto or as an alternative, when moving out of the adapted extreme value range, the adapted extreme value is increased by a slight amount so that an upward adaptation is possible even without actuating the brake pedal. A moving out of the adapted extreme value range takes place, for example, when a pregiven offset value is exceeded by the adapted extreme value.

The extreme values of both measurement quantities are adapted in this way independently of each other when making a redundant detection of the measurement quantities.

In the embodiment of FIG. 2, the two measurement quantities UP1 and UP2 are read in. The two measurement quantities are supplied to respective adaptation algorithms (100, 100a) when at least one of the conditions described below is present. This takes place in that essentially the measures noted above for determining and storing the adapted extreme values of the particular measurement quantities are carried out by means of an integrator connected as a lowpass. For forming the adapted measurement quantities, respective logic elements 102 and 102a are provided wherein the respective stored extreme values are logically coupled to the detected measurement quantities UP1 and UP2. Preferably, the extreme values are subtracted from the detected measurement quantities UP1 and UP2. In this way, the adapted measurement quantities UP1AD and UP2AD are formed. Furthermore, status signals B_L1AD and B_L2AD are determined on the basis of the adapted measurement values. These status signals are a measure for the reaching of the extreme value range by the measurement quantities. For this purpose, the adapted measurement quantities are supplied to respective comparators 104 and 104a wherein the adapted measurement quantity is compared to a predetermined limit value which is stored in the particular memory cell (106 or 106a). The status signal is set =when there is a drop below this limit value and reset when this limit value is exceeded. The adapted total status signal B_LAD is formed in an OR logic element 105.

The adaptation algorithm (100 or 100a) is activated under predetermined conditions. This is symbolized in FIG. 2 by the switching element 108 or 108a or by the direct access of an activation signal to the adaptation algorithm (100 or 100a). Here, reference can be made to the broken lines 110, 110a. The adaptation is permitted when, at least on the basis of at least one measurement quantity, it has been determined that the extreme value range was reached and/or when the brake pedal is actuated and/or when the deviation between the two measurement quantities UP1 and UP2 drops below a predetermined limit value and/or when the gradient of at least one of the measurement quantities drops below a predetermined threshold value. An activation signal is, for example, formed in the OR logic element 112. This signal activates the adaptation of both measurement quantities. Thereafter, the adaptation is active when either a signal S_BR is present, which represents the actuation of the brake pedal, or at least one of the idle conditions B_L1AD or B_L2AD is satisfied or when the difference between the two measurement quantities drops below a predetermined value. The idle conditions B_L1AD and B_L2AD are determined on the basis of the adapted measurement quantities. The two extreme value signals B_L1AD and B_L2AD are logically coupled in the OR logic element 114. An activation signal is supplied to the OR logic element 112 when at least one of these signals is present. For checking the last-mentioned condition, the deviation between the two measurement quantities UP1 and UP2 is formed in the comparator 116 and the amount of this deviation is formed in an amount former 118. The amount of the deviation is compared to the pregiven limit value in the comparator 120. This limit value is stored in the memory cell 122. A signal is generated by the comparator 120 when the amount of the deviation drops below the limit value.

A further condition, which is checked additionally or alternatively to the above-mentioned conditions, is a monitoring of the gradients of the measurement quantities. This condition likewise leads to the activation or deactivation of the adaptation. For this purpose, a quantity is formed from each measurement quantity in a gradient former 124 or 124a and this quantity defines the time-dependent change of the measurement quantity. Each of the quantities formed in this manner is supplied to an amount former (126 or 126a). The magnitude of the gradient is compared to a limit value in a comparator (128 or 128a). The limit value is stored in a memory cell (130 or 130a). If the amount of the time-dependent change of the particular signal value is less than the limit value, then the adaptation is activated via the OR logic element (132 or 132a) or, when the limit value is exceeded by the gradient, the adaptation is suspended.

The adaptation is enabled with the presence of at least one of the above-mentioned conditions. The adaptation is suspended when the at least one of the conditions (or a combination of the conditions) is not present. Here, preferably only the downward adaptation and not the upward adaptation is suspended when the brake pedal is actuated or when there is a movement out of the extreme value range.

In the preferred embodiment, the adaptation is only permitted after there has been a movement out of the extreme value range at least once so that the adaptation is again possible with the next entry into the extreme value region. It is not the adapted limit value B_L1AD or B_L2AD which is used as the limit value for this limitation as to the enablement of the adaptation but a pregiven limit value to which the non-adapted measurement quantity UP1 or UP2 is compared.

It is common to all of the above-mentioned activation preconditions that, when they are present, one can assume that the measurement quantity is not influenced by factors which disturb the adaptation (defective conditions, acceleration, etcetera).

In the preferred embodiment, the adaptation takes place via an integrator whose output is subtracted from the input signal whereby a lowpass performance results. If the input signal of this lowpass is set to the value zero when one of the above conditions is no longer satisfied, then the value of the lowpass remains the same. The integration time constant of the integrator is changeable. When the brake pedal is actuated, a switchover from a slower to a more rapid time constant is made because then one can assume that the accelerator pedal is not actuated. Furthermore, the integrator is limited in the downward direction to a minimum tolerance value and, in the upward direction, to a maximum tolerance value.

The smallest value of the integrator is stored in a minimum value memory in the context f the adaptation. When activating the system (original start), this value is set to a pregiven maximum value. The stored value is set to the current value of the integrator when a brake pedal actuation signal is present. Additionally or alternatively, the adapted value is increased, preferably, to a value, which is derived from the adapted measurement quantity, when the adapted measurement quantity has become greater starting from lower values and a pregiven threshold value (for example, when leaving the zero point region) has been exceeded. This is only permitted again after a renewed reaching of the adapted extreme value region in order to prevent an unwanted uplearning.

In addition to the adapted idle condition and the adapted measurement quantity, in other embodiments, the absolute idle condition (B_L1, B_L2) and the measurement quantity itself (not adapted) are supplied (see memory 140, 140a, comparator 142, 142a). The absolute idle condition (B_L1, B_L2) is derived from the measurement quantity by a comparison to a pregiven limit value. The control of the vehicle and especially the driver command computation in the case of measurement quantities, which represent the accelerator pedal position, is then executed in dependence upon operating conditions on the basis of the adapted and/or the non-adapted quantities.

If potentiometers are used as measuring devices, then, in some embodiments, because of formation of an excess contact resistance between potentiometer track and wiper contact as a consequence of abraded material, the following problematic can result. It can happen that the measurement quantity of the potentiometer (monitoring potentiometer) lies on the lower tolerance limit and the measurement quantity of the other potentiometer (control potentiometer) lies on the upper tolerance limit. The correctness of the other potentiometer is monitored with the aid of the monitoring potentiometer and the measurement quantity of the other potentiometer forms the basis of the control function. The above leads to the condition that the reaching of the extreme value range is signalized by the measurement quantity of the monitoring potentiometer already with a position, in which the measurement quantity of the control potentiometer still displays relatively high values. This performance is unwanted because, under circumstances (for example, for increased contact resistances), reaching the extreme value range is detected when actually this region has not yet been reached.

Figure 3:
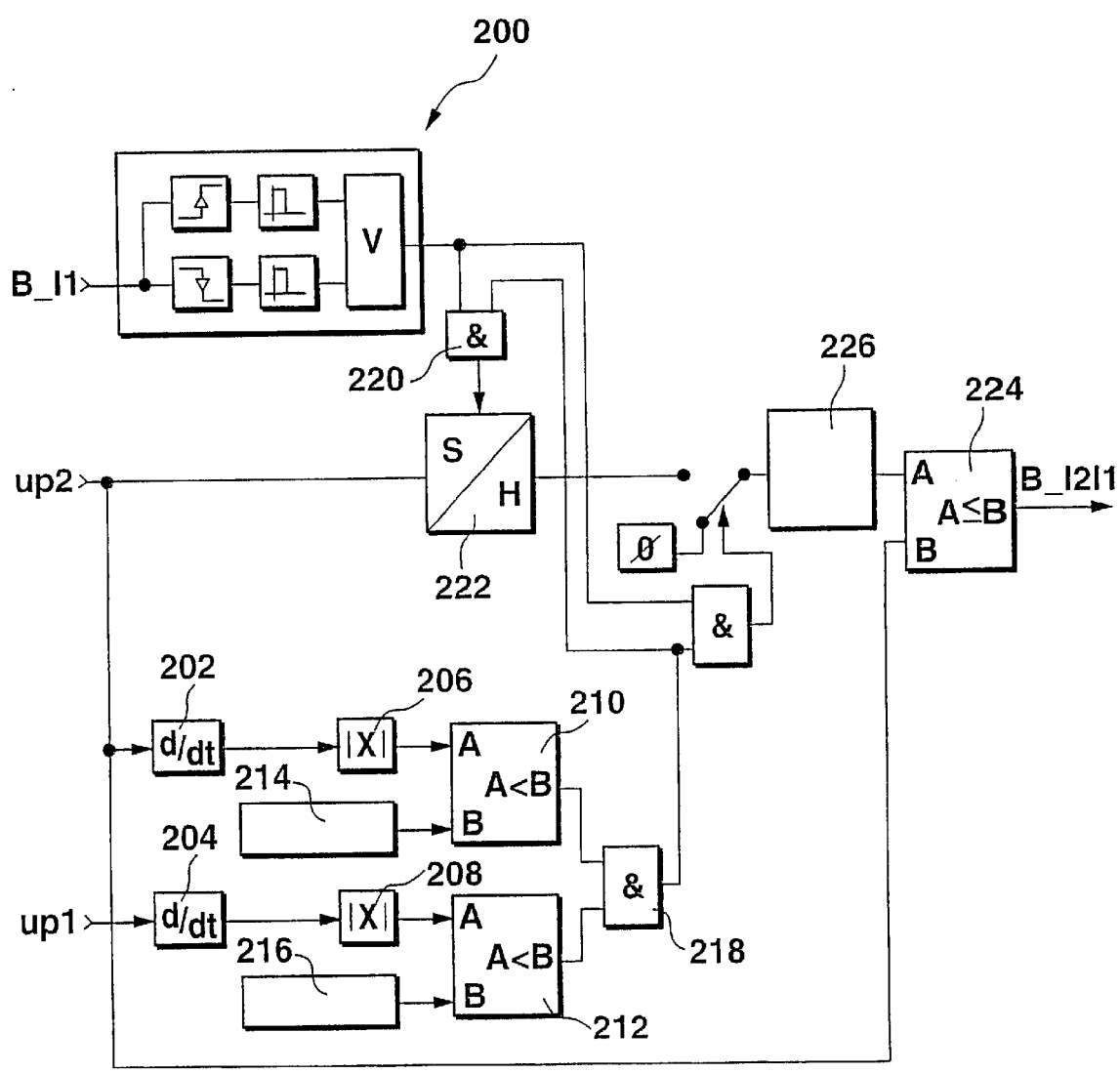

In order to avoid this situation, as extreme value for the measurement quantity of the one potentiometer (preferably, the monitoring potentiometer), the upper limit of the extreme value range of the other measurement quantity (preferably of the control potentiometer) is determined and, from this value, a tight tolerance extreme value range B_L2L1 is formed for the measurement quantity of the one potentiometer which is not supported by an adaptation which could be made incorrect by contact resistances. This is shown in the sequence diagram of FIG. 3 in one embodiment.

When the measurement quantity UP1 of the first potentiometer drops below or exceeds a preset threshold value, a switching signal B_L1 is set. The value of the measurement quantity UP2 of the second potentiometer is stored with the positive or negative flank of the switching signal B_L1 (see block 200). The idle condition B_L2L1 is satisfied when the actual measurement quantity of the second potentiometer is below this stored value. In this way, the above-mentioned discrepancies as a consequence of the contact resistances in the region of the second potentiometer can no longer occur so that here too an adaptation is permitted when the measurement quantity with great probability is not influenced by factors disturbing the adaptation (here, the contact resistances, etcetera).

In the preferred embodiment, the measurement quantity value of the second potentiometer is detected in a simple sample and hold element 222. For this purpose, the gradients of the measurement quantities UP2 and UP1 are formed in the gradient formers 202 and 204, respectively; the magnitude of these quantities is determined in respective ones of the magnitude formers 206 and 208, respectively; and, these quantities are compared in the comparators 210 and 212, respectively, to limit values stored in memory cells 214 to 216. The current measurement quantity UP2 is kept in the sample-and-hold element 222 when both gradients (see AND logic element 218) drop below the predetermined limit value and (AND logic element 220) if a positive or negative flank of the switching signal B_L1 is present (measurement quantity of the first potentiometer has just reached the extreme value range or has just left the same). The kept value is the value of the measurement quantity of the second potentiometer which is present when the measurement quantity of the first potentiometer reaches or leaves the non-adapted extreme value range. The kept value is stored in an integrator 226 connected, for example, as a lowpass when the above-mentioned conditions are present. The stored extreme value is then compared to the measurement signal value UP2 (see comparator 224). The extreme value region status B_L2L1 is set when there is a drop below the limit value. If an integrator is used for storing the value, then this integrator is limited in the downward direction to the minimum tolerance value of the second potentiometer and the upper maximum value as well as the initialization value are set to a value which is formed from the maximum tolerance of the second potentiometer and the minimum tolerance of the first potentiometer. In this way, a reliable idle recognition is achieved by the second potentiometer when the transient condition for the adaptation is not yet complete.

Another realization is that, in lieu of the flank change of the switching signal, an inquiry is made as to whether the measurement quantity UP1 of the first potentiometer is in a predetermined region about the maximum extreme value thereof. If this is recognized and if the other above-mentioned conditions are satisfied, the adaptation of the measurement quantity via the above-described integrator is enabled. This leads to a more rapid transient performance when there is a quasi-constant accelerator pedal position in the vicinity of the maximum value of the zero region of the first potentiometer.

With the nature of the adaptation described above, the influence of the contact resistances on the second potentiometer is substantially precluded because the learned extreme value, as a rule, does not lie at the actual extreme value and therefore at the turning point whereat increased abraded material occurs.

A residual risk as to an incorrectness of the extreme value adaptation still is present when the actual extreme value is reached because of the uppermost tolerance position at the maximum value of the measurement quantity of the first potentiometer. The maximum value limits the zero region. Then, the adapted value can become less because of the contact resistances on the second potentiometer. An idle condition is no longer recognized when this contact resistance later vanishes. This can be avoided in that the extreme value of the second potentiometer is not learned directly in the maximum extreme value of the first potentiometer but somewhat higher. For this purpose, the inquiry is carried out to a value range, which lies above the maximum extreme value, in the method described last above.

Finally, the reliability of the extreme value adaptation is established in that the status signal is formed via reaching the zero region from an OR circuit of the adapted extreme values of both measurement quantities so that a double error from two like contact resistances on both potentiometers must be present which are no longer present when next reaching the zero region in order to prevent forming the status signal. For this case, the rapid upward adaptation for actuated brakes is provided which reliably ensures a reaching of the extreme value.

Different limit values for the extreme value range are made available by the procedure described above. Functions in accordance with this procedure can be activated for the second potentiometer so that an improved, more reliable recognition of the reaching of the extreme value region (idle recognition) can be achieved. These functions are activated in dependence upon: absolute thresholds, adapted thresholds or the narrowed threshold value.

Figure 4:
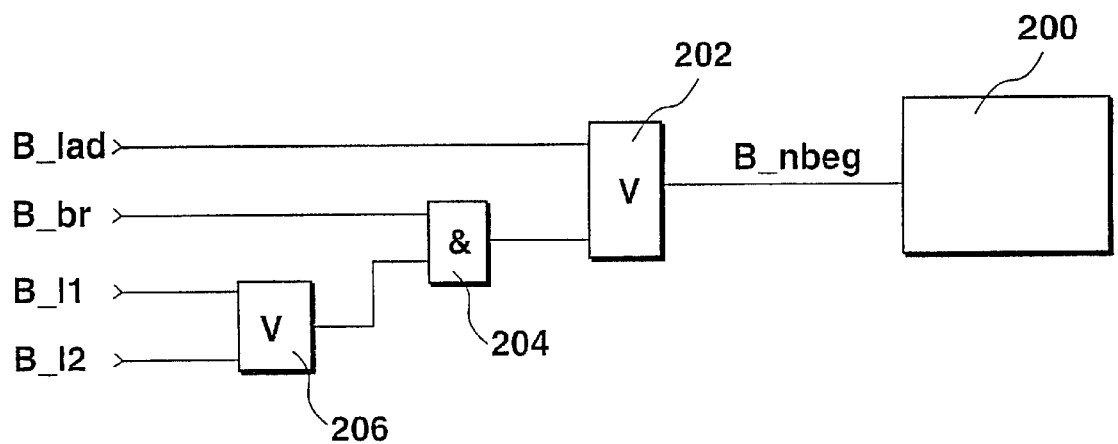
FIGS. 4, 5, 6 and 7 show various advantageous procedures for logically combining these signals for activating the particular function, for example, a limiter; and, FIGS. 8a and 8b are graphs showing the operation of the preferred embodiment as a function of time.

The function (especially the rpm limiter) is activated in accordance with the combination of the individual status signals in accordance with FIG. 4 especially for a contactless transducer but also for a reliable potentiometer wherein no inaccuracies should be present as a consequence of contact resistances which are too high when adapting the minimum value. This also applies in the event that, in the individual case, the above-described safeguard against an increased contact resistance has proven sufficient to avoid such inaccuracies. The above-mentioned function is activated when reaching the idle region or when leaving the idle region and the status signals are determined on the basis of at least one measurement quantity via a limit value comparison. The sequence diagram represents a program of the microcomputer 14.

The function 200 is enabled (B_nbeg set) when reaching the pregiven value region for the adapted measurement has been detected or (OR logic element 202) when the brake pedal is actuated (B-BR set) and (AND logic element 204) based on one or (OR logic element 206) both non-adapted measurement quantities, the reaching of the value range has been detected (B_L1 or B_L2 set). The reaching of the pregiven value region was on the basis of the adapted first measurement quantity or on the basis of the adapted second measurement quantity (B_LAD set). This solution is always preferably used because this solution reduces the torque to the idle gas torque also for the very unlikely case of unlearning the adaptation of both measurement quantities because of increased contact resistances and thereafter simultaneous vanishing of the increased contact resistances of both potentiometers with entry into the idle at least for a depressed brake pedal.

Figure 5:
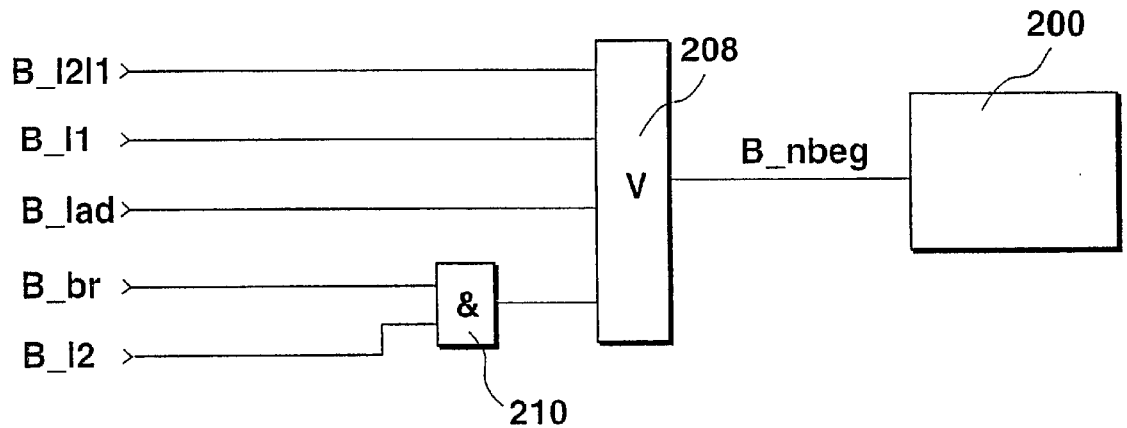

A second version of the activation conditions for one of the above-described functions (for example, the rpm limiter) is shown based on the sequence diagram of FIG. 5. This function is safeguarded against increased contact resistances. The sequence diagram of FIG. 5 also defines a program of the microcomputer 14. The function 200 is activated (B_nbeg set) when the adapted idle condition B_LAD (see above) is set or (OR logic element 208) the brake pedal is actuated (B_BR set) and (AND logic element 210) the non-adapted second measurement quantity has dropped below the limit value (B_L2 set). Additionally, the limiter is activated when one of the conditions B_L1 and B_L2L1 is set whose formation is shown above. An influence on the increased contact resistances in the region of the first measuring device is precluded by the use of the absolute idle condition B_L1 for the first measurement quantity. This is so because the fixed pregiven limit value for idle detection lies sufficiently outside of the region endangered because of increased contact resistances. A possible influence because of increased contact resistances in the region of this second measuring device is likewise substantially precluded by the use of the maximum value for the idle region of the second measurement quantity (condition B_L2L1). The second maximum value is adapted to the contact resistances in the region of the second measuring device.

It is especially advantageous when, in the preferred embodiment, the driver command determination for controlling the torque of the drive unit continues to be carried out via the non-adapted driver command signal UP1 and not via the adapted driver command signal UP1AD and the above-illustrated starting ramp (torque buildup) is maintained. In this case, a complete safeguarding of the torque input is obtained which cannot be made incorrect because of possible erroneous adaptations in the adapted signal. This solution is especially advantageous when, in addition, a monitoring of the torque of the drive unit takes place which can be also limited to the idle range and the near idle range.

However, if the rpm limiter is the only utilized monitoring measure, then, when using at least one potentiometer as a measuring device for detecting the measurement quantity or quantities, additional measures are required in some embodiments in order to reliably preclude a negative effect on the rpm limiter by increased contact resistances on the at least one potentiometer. This is so, most of all, in embodiments wherein the idle condition of the second measurement quantity (B_L2L1) is not present with this idle condition being adapted to the idle limit value of the first measurement quantity.

Figure 6:
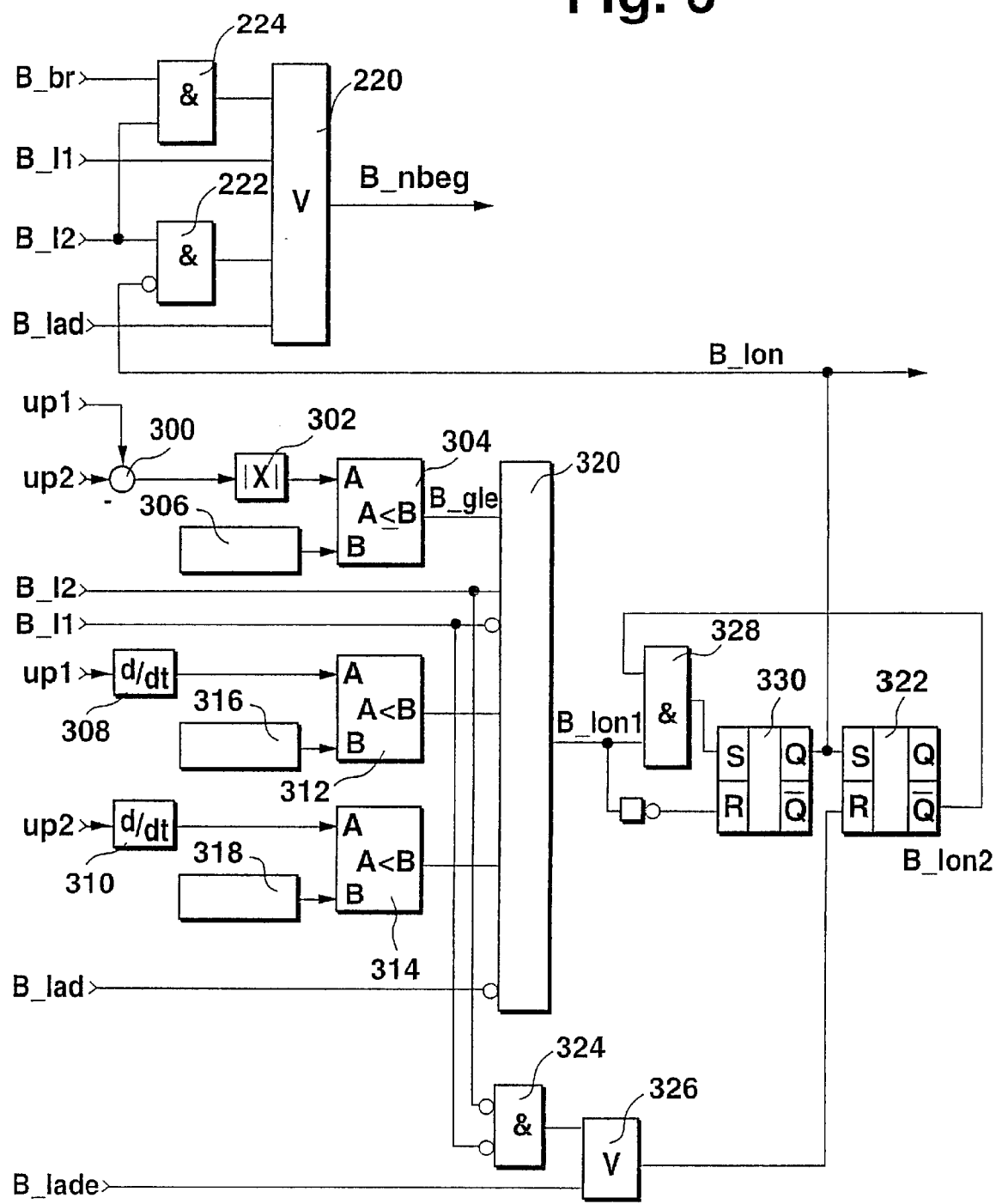
Figure 7:
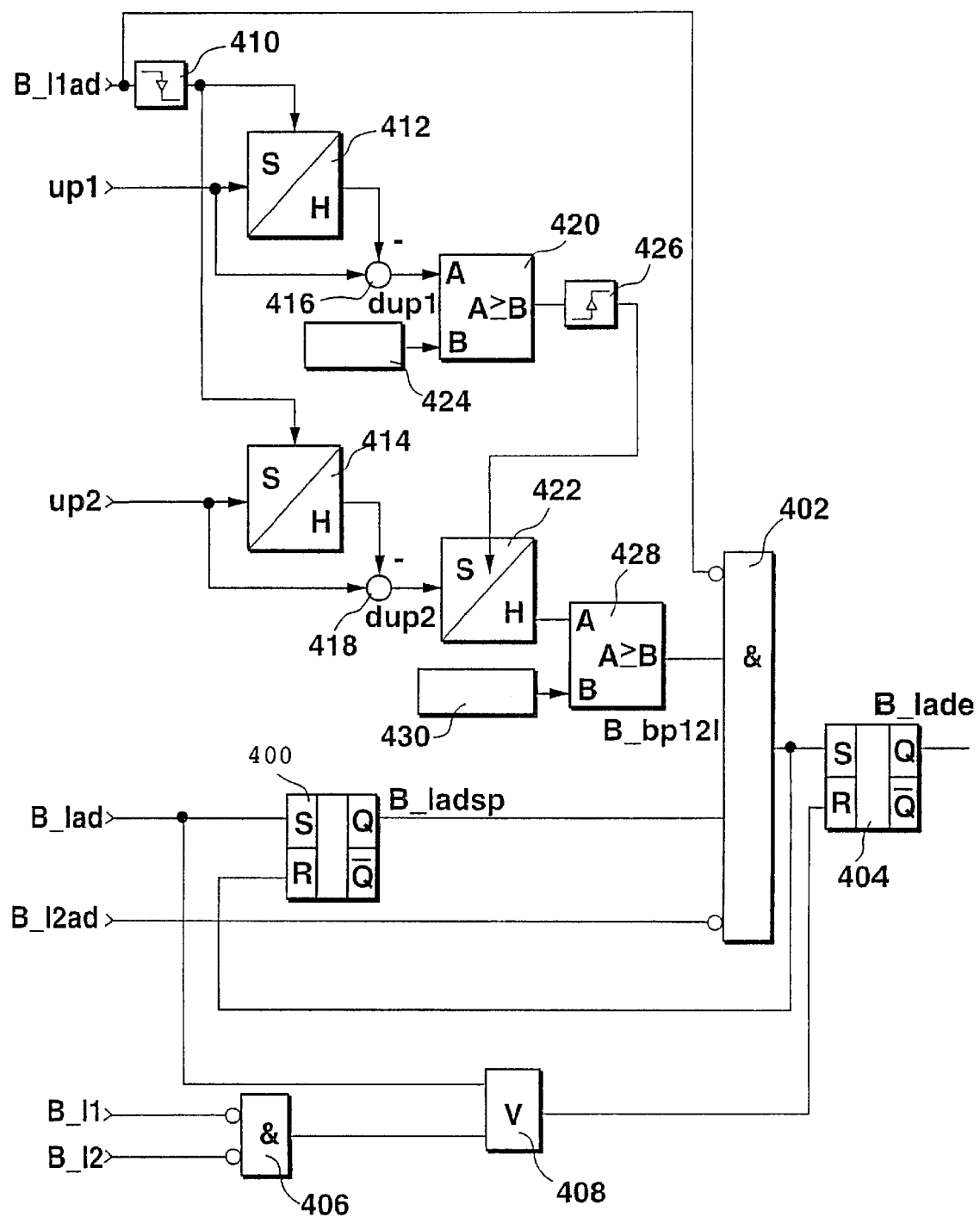

In this case, the method shown in FIGS. 6 and 7 is utilized which exhibits a hysteresis. In this method, the rpm limiter is active when the absolute idle condition of the first measurement quantity (B_L1) is present or (OR logic element 220) when the absolute idle condition of the second measurement quantity (B_L2) is present when this measurement quantity returns into the idle range from larger values. The limiter is only then not active when the idle condition of the second measurement quantity is present when additional preclusion criteria are satisfied (B_LON set, AND logic element 222). The limiter is further active when the adapted region of one of two measurement quantities is reached (B_LAD set). The limiter is switched off when there is a movement out of the adapted region and a movement of the guide signal quantity was detected, that is, of the first measurement quantity.

In correspondence to the sequence diagram of FIG. 6, the rpm limiter is therefore activated when the absolute idle signal of the first measurement quantity B_L1 is present or the idle signal based on an adapted measurement quantity B_LAD is present. In addition, the rpm limiter is active when the absolute idle signal of the second measurement quantity B_L2 is present and the condition for the idle without rpm limiter B_LON is not set. Furthermore, an activation of the rpm limiter can be provided additionally with the actuation of the brake pedal B_BR when, in addition, the absolute idle signal on the basis of the second measurement quantity is present (B_L2, AND logic element 224). In this way, the rpm limiter is also then activated when the condition for an idle is set without the rpm limiter when actuating the brake pedal and when reaching the idle region via the second measurement quantity.

The above is debounced in order to avoid a negative effect in the driving performance because of torque changes so that, when there is a change of the additional conditions after a one-time activated rpm limiter, the limiter cannot be switched off again. This debouncing as well as the formation of the additional conditions, which deactivate the limiter, are shown in the lower portion of the sequence diagram of FIG. 6. First, the two measurement quantities UP1 and UP2 are read in and, in the comparator 300, the deviation between the two measurement quantities is formed and the amount of the deviation is determined in the amount former 302 and the amount of the deviation is compared in the comparator 304 to a limit value stored in the memory 306. If the magnitude of the deviation is less than this limit value, then the condition B_GLE is set which indicates the synchronism of the measurement quantities in the context of the pregiven tolerance. In addition, the gradients of the two measurement quantities or the driver command values, which are derived therefrom, are formed in the gradient formers 308 and 310 and are compared in the comparators 312 and 314 to the negative limit value derived in the memory cells 316 and 318 and, when there is a drop below the particular limit value by the particular gradient, corresponding condition signals are generated which indicate that the gradient does not lie above the pregiven threshold, that is, no rapid return of the pedal is present. In addition, the adapted idle condition B_LAD as well as the idle conditions B_L2 and B_L1 are read in which are based on the absolute measurement quantities.

In the AND logic element 320, an output signal B_LON1 is determined when: the condition of synchronism is satisfied; the idle condition is set on the basis of the absolute value of the second measurement quantity; the gradient conditions are satisfied; and, the idle conditions for the adapted measurement quantities and for the absolute first measurement quantity are not set. The condition B_LON1 shows that idle is present without the idle limiter being active. If this condition should vanish while the absolute idle condition B_L2 for the second measurement quantity remains set, then the condition B_LON1 may not be activated a second time. The following debouncing serves this purpose. A flip-flop 322 is provided which indicates that the condition B_LON1 has not yet been set (B_LON2). This flip-flop 322 is reset when, in accordance with the AND logic element 324, none of the idle conditions B_L1 and B_L2 is present or (see OR logic element 326) an additional condition B_LADE is present whose formation is described below. If the flip-flop 322 is in the reset state and the condition B_LON1 is set, then a flip-flop 330 is set via the AND connection 328 with the output of the flip-flop 330 defining the condition B_LON deactivating the limiter. If this condition is set, then the flip-flop 322 is set. A renewed setting of the condition B_LON is not possible because of the feedback via the AND connection 328. The flip-flop 330 and the condition B_LON are reset when the condition B_LON1 is no longer present. Then, a resetting of the flip-flop 322 and therefore a renewed setting of B_LON is again possible.

Overall, it is ensured in this way that the rpm limiter only operates when the gradients of the measurement quantities are low and the synchronism between the two measurement quantities is satisfied when the absolute idle condition B_L2 on the basis of the second measurement quantity is present. If, because of a previous uniform drift of both measurement quantities, the adapted idle range can no longer be detected with a renewed forward movement, the rpm limiter is activated with the setting of the absolute idle condition B_L2 when the driver rapidly takes the foot from the accelerator pedal which, in the case of an error, is the natural reaction of the driver.

If the adapted idle range B_LAD was once detected and then there is a movement away therefrom (which is represented by setting the condition B_LADE), the flip-flop 322 is likewise reset. If now the idle condition without the active rpm limiter B_LON1 is satisfied, the rpm limiter is blocked even when the condition B_L2 is set. This means that, when pressing the accelerator pedal after a complete release thereof, the rpm limiter no longer operates after leaving the idle region of the absolute value of the first measurement quantity B_L1. Therefore, the rpm limiter counteracting the driver command is avoided in the error-free operation.

An example of the generation of the idle condition B_LADE is shown with the sequence diagram of FIG. 7. The entry into the adapted idle range is stored by setting flip-flop 400 as the condition B_LADSP. If the adaptive idle conditions B_L1AD and B_L2AD are no longer satisfied and the flip-flop 400 is set and if the condition B_BP12L is present (AND logic element 402), then the condition B_LADE is set by setting a second flip-flop 404 (the condition B_BP12L is explained below). At the same time, the first flip-flop 400 is reset (feedback of the output of the AND logic element 402 to the reset input of the flip-flop 400) and prepared for a renewed setting of the storage condition with the entry into the adapted idle range B_LAD (B_L1AD or B_L2AD set). In the event that B_LAD occurs, the flip-flop 404 is reset (OR connecting element 408). The reset takes place even when the absolute idle regions are left by the measurement quantities (B_L1 and B_L2 reset) (AND logic element 406).

The condition B_BP12E defines the movement detection of the measurement quantities. If the first measurement quantity leaves the adapted idle region (detection of the negative flank in B_L1AD, 410), then the measurement quantities UP1 and UP2 are stored in the sample-hold circuits 412 and 414. Thereupon, the deviations DUP1 and DUP2 are formed in the comparators 416 and 418, respectively, from the stored value. The deviation of the first measurement quantity is compared in comparator 420 to the limit value stored in the memory 424 and, when this limit value (positive flank detected, 426) is exceeded, the deviation of the second measurement quantity from its stored value is stored by the sample-and-hold circuit 422. This stored value is then compared to the limit value, which is stored in the memory 430, in the comparator 428 and, when this limit value is exceeded by the stored value, the condition is deemed to be satisfied, that is, the second measuring device has moved and this movement was detected.

In the context of a further embodiment, the termination of the activation of the rpm limiter after a completed detection of movement is not dependent only on moving out of the adapted idle range or out of the absolute idle range by the first measurement quantity but, when there is a one-time activation of the rpm limiter in the absolute idle range, the rpm limiter is again deactivated when a minimum is detected in the signal trace of the first measurement quantity and is exceeded by the value of the adaptive idle range and a movement of both measuring devices was detected in the direction of an increase of the measurement quantity (actuation of the accelerator pedal). Therefore, after triggering the rpm limiter in the absolute idle range without reaching the adapted idle range, the termination of the idle limiter must not be awaited before there is a movement out of the absolute region; instead, only until the detection of movement after the minimum of the signal trace of the first measurement quantity is concluded.

In FIG. 8, the above-described procedure is shown in the context of time diagrams. Here, FIG. 8a shows the trace of the torque of the drive unit and the broken line shows the trace of the desired torque pregiven by the driver; whereas, in FIG. 8b, the traces of the first and second measurement quantities are shown. The absolute limit values for the idle region of the first measurement quantity UP1LMX as well as the second measurement quantity UP2LMX are shown in FIG. 8b. The driver releases the accelerator pedal and the torque drops as well as the measurement quantities UP2 and UP1. At time point T0, the first measurement quantity drops below the maximum value for the second measurement quantity so that the condition B_L12 is set. Starting at this time point, the driver command torque is further reduced in correspondence to the accelerator pedal characteristic field below the corresponding driver pedal angle.

At time point T1, the second measurement quantity drops below the maximum value so that the condition B_L2 is set. At this time point, the rpm limiter is activated. The rpm limiter controls the torque of the drive unit to the minimum value in accordance with a pregiven change limit. At time point T2, the first measurement quantity drops below its limit value so that the condition B_L1 is set. In this case, and as shown in FIG. 8a by the broken line, the desired torque, which is derived from the first measurement quantity, is zero. At time point T3, the second measurement quantity drops below the adapted idle limit value so that the condition B_L2AD is set and, also at this time point, the adapted idle region B_LAD is reached. Correspondingly, at time point T4, the condition B_L1AD is set by the drop of the measurement quantity below the adapted limit value. The minimum torque is reached at time point T5 as shown in FIG. 8a. At time point T6, the first measurement quantity exceeds the adapted limit value so that the condition B_LAD1 is reset. At time point T7, the same measures take place with respect to the second measurement quantity. The movement of the measurement quantity is detected at time point T8, that is, the condition B_BP12E is set. Therefore, the condition B_LADE is also set. The first measurement quantity exceeds the absolute limit value at time point T9 so that the condition B_L1 is reset. The rpm limiter is deactivated when: the adapted idle condition B_LAD is reset, the detection of movement is carried out, the idle condition for the first measurement quantity is reset, and the synchronism of the two measurement quantities is proper. In this case, the torque increases via the accelerator pedal characteristic field; however, the characteristic field is not reached suddenly but is approached via a load change, which is softened, via a time-dependent ramp and approached starting from the Mdmin value of the rpm limiter. At time point T10, the second measurement quantity exceeds the absolute limit value; whereas, at time point T11, the first measurement quantity also exceeds the absolute limit value of the second measurement quantity so that, at this time point, also the region of the flatter approach ramp of the accelerator pedal characteristic field is left.

The above-described procedure is utilized in an advantageous manner for all controls which control the torque of a drive unit (diesel engine, fuel-injection engine, electric motor etcetera) on the basis of a driver command determined on the basis of two measurement quantities. Furthermore, the procedure illustrated can also be applied to other redundantly detected measurement quantities for which a corresponding problematic results with respect to the activation and deactivation of functions in dependence upon changing threshold values.

In the case of a fault of a measurement quantity, the comparison of other measurement quantities to the absolute threshold value is used in lieu of the comparison of the adapted measurement quantities to the adapted threshold value.

It is understood that the foregoing description is that of the preferred embodiments of the invention and that various changes and modifications may be made thereto without departing from the spirit and scope of the invention as defined in the appended claims.

What is claimed is:

1. A method for controlling the drive unit of a vehicle, the method comprising the steps of:
   detecting a first measurement quantity;
   detecting a second measurement quantity and said first and second measurement quantities being redundant to each other;
   comparing each of said measurement quantities to a threshold value;
   generating signals characterizing a drop below or an increase above said threshold value;
   activating or deactivating a function for controlling said drive unit when a pregiven combination of said signals is present; and,
   selecting the threshold values so that a drop therebelow represents the idle range of said drive unit.

2. The method of claim 1, wherein said measurement quantities represent the position of an operator-controlled element actuated by the driver of said vehicle.

3. The method of claim 1, wherein said threshold values are absolute threshold values with reference to said measurement quantities or adapted threshold values with reference to adapted measurement quantities.

4. The method of claim 1, wherein the activation or deactivation of said function takes place on the basis of an OR logic coupling of the signals which represent dropping below or exceeding adapted threshold values by the adapted measurement quantities.

5. The method of claim 1, wherein an activation of said function takes place when the brake pedal is activated when at least one of the signals indicates a drop below the absolute threshold values by the nonadapted measurement quantities.

6. The method of claim 1, wherein said function is an rpm limiter.

7. The method of claim 1, wherein said function is the enabling of torque from an accelerator pedal characteristic field.

8. The method of claim 1, wherein an OR logic coupling of the signals is used for activation or deactivation when there is a defective synchronism condition of said two measurement quantities to each other when at least one of said signals is present which indicates a drop below the absolute threshold values by the nonadapted measurement quantity; and, the OR logic coupling of the signals indicates a drop below the absolute threshold values by the non-adapted measurement quantities.

9. The method of claim 1, wherein said function is activated when a large gradient is detected when at least one of said measurement quantities is below its absolute threshold value; and, when no large signal gradients are present, said function is switched on only when at least one of the adapted measurement quantities drops below its adapted threshold value.

10. The method of claim 1, wherein: when said function is once triggered, said function is only deactivated again when at least one measurement quantity has exceeded its absolute threshold value or at least one measurement quantity has dropped below its adapted threshold value and then again exceeded its adapted threshold value.

11. The method of claim 1, wherein: after a one-time triggering of said function, said function is only activated again when the following occurs: a minimum is detected in the trace of a measurement quantity; said minimum is again exceeded by a specific value; and, a movement is detected of both of said measurement quantities in a direction of an increase.

12. The method of claim 1, wherein: in the event of a defect of one measurement quantity, the comparison of the other measurement quantity to the absolute threshold value is used in lieu of the comparison of the adapted measurement quantity to the adapted threshold value.

13. The method of claim 1, wherein the driver command is derived from at least one measurement quantity and at least one of the control of the torque of the drive unit and the limiting of the torque takes place in dependence upon said driver command.

14. An arrangement for controlling the drive unit of a vehicle, the arrangement comprising:
   means for detecting a first measurement quantity;
   means for detecting a second measurement quantity and said first and second measurement quantities being redundant to each other;
   an actuating element operatively connected to said drive unit;
   a control apparatus for activating said actuating element in the context of a function which is activated or deactivated;
   said control apparatus including means for comparing each of said measurement quantities to at least one threshold value and for generating signals characterizing a dropping below or exceeding said threshold value;

said control apparatus further including means for activating or deactivating said function for controlling said drive unit when a pregiven combination of said signals is present; and, said control apparatus further including means for selecting the threshold values so that a drop therebelow represents the idle range of said drive unit.

15. A method for controlling the drive unit of a vehicle, the method comprising the steps of:

detecting a first measurement quantity;

detecting a second measurement quantity and said first and second measurement quantities being redundant to each other;

comparing each of said measurement quantities to a threshold value;

generating signals characterizing a drop below or an increase above said threshold value;

activating or deactivating a function for controlling said drive unit when a pregiven combination of said signals is present;

wherein an OR logic coupling of the signals is used for activation or deactivation when there is a defective synchronism condition of said two measurement quantities to each other when at least one of said signals is present which indicates a drop below the absolute threshold values by the nonadapted measurement quantity; and, the OR logic coupling of the signals indicates a drop below the absolute threshold values by the nonadapted measurement quantities.

16. A method for controlling the drive unit of a vehicle, the method comprising the steps of:

detecting a first measurement quantity;

detecting a second measurement quantity and said first and second measurement quantities being redundant to each other;

comparing each of said measurement quantities to a threshold value;

generating signals characterizing a drop below or an increase above said threshold value; and, activating or deactivating a function for controlling said drive unit when a pregiven combination of said signals is present;

wherein said function is activated when a large gradient is detected when at least one of said measurement quantities is below its absolute threshold value; and, when no large signal gradients are present, said function is switched on only when at least one of the adapted measurement quantities drops below its adapted threshold value.

* * * * *